United States Patent
Jones et al.

(10) Patent No.: US 12,278,693 B2
(45) Date of Patent: Apr. 15, 2025

(54) STRETCHED SINGLE OPTICAL SPAN COMMUNICATIONS SYSTEM AND METHOD AVOIDING HAZARDOUS POWER LEVELS

(71) Applicant: Ciena Corporation, Hanover, MD (US)

(72) Inventors: Kevan Peter Jones, Ottawa (CA); Vipul Bhatnagar, Kensington, MD (US); Marco Gaudet, Ottawa (CA); Francois Maurice Rheal Charron, Stittsville (CA)

(73) Assignee: Ciena Corporation, Hanover, MD (US)

(*) Notice: Subject to any disclaimer, the term of this patent is extended or adjusted under 35 U.S.C. 154(b) by 366 days.

(21) Appl. No.: 18/075,847

(22) Filed: Dec. 6, 2022

(65) Prior Publication Data
US 2024/0187123 A1   Jun. 6, 2024

(51) Int. Cl.
*H04B 10/80* (2013.01)
*H04J 14/02* (2006.01)

(52) U.S. Cl.
CPC ........ *H04J 14/0297* (2013.01); *H04B 10/807* (2013.01); *H04J 14/0293* (2013.01)

(58) Field of Classification Search
CPC .. H04B 10/807; H04J 14/0297; H04J 14/0293
See application file for complete search history.

(56) References Cited

U.S. PATENT DOCUMENTS

| | | | |
|---|---|---|---|
| 5,485,299 A | 1/1996 | Jones | |
| 6,208,441 B1 | 3/2001 | Jones et al. | |
| 6,310,994 B1 | 10/2001 | Jones et al. | |
| 6,351,322 B1 | 2/2002 | Ransford et al. | |
| 6,421,169 B1 * | 7/2002 | Bonnedal | H01S 3/1301 359/337.2 |
| 6,532,087 B1 | 3/2003 | Ransford et al. | |
| 6,542,233 B1 | 4/2003 | Bray et al. | |
| 6,621,621 B1 | 9/2003 | Jones et al. | |

(Continued)

FOREIGN PATENT DOCUMENTS

| | | |
|---|---|---|
| CA | 2291531 A1 | 12/1999 |
| EP | 1063545 A1 | 12/2000 |

(Continued)

*Primary Examiner* — Tanya T Motsinger
(74) *Attorney, Agent, or Firm* — Baratta Law PLLC; Lawrence A. Baratta, Jr.

(57) ABSTRACT

A method of implementing a stretched single optical communication span includes receiving one or more optical signals from an optical fiber span having high loss; adding a pilot signal to the one or more optical signals, subsequent to the receiving; and amplifying the one or more optical signals and the pilot signal with a pre-amplifier that is an Erbium Doped Fiber Amplifier (EDFA). Advantageously, the stretched single span operates below a Hazard 1M environment. A node in a stretched single optical communication span includes an optical multiplexer connected to an optical fiber span having high and a pilot signal, and configured to output a combination of one or more optical signals from the optical fiber span and the pilot signal; and a pre-amplifier that is an EDFA configured to receive the output of the optical multiplexer and provide amplification of the one or more optical signals and the pilot signal.

20 Claims, 3 Drawing Sheets

(56) References Cited

U.S. PATENT DOCUMENTS

| | | |
|---|---|---|
| 6,646,795 B1 | 11/2003 | Jones et al. |
| 6,751,414 B1 | 6/2004 | Davies et al. |
| 6,765,659 B1 | 7/2004 | Bhatnagar et al. |
| 6,795,607 B1 | 9/2004 | Archambault et al. |
| 7,038,841 B2* | 5/2006 | Chang .................. H01S 3/1001 |
| | | 359/341.41 |
| 7,054,562 B1 | 5/2006 | Balakrishnan et al. |
| 7,075,711 B2 | 7/2006 | Haggans et al. |
| 7,343,096 B1 | 3/2008 | Bhatnagar et al. |
| 7,929,861 B2 | 4/2011 | Solheim et al. |
| 8,811,822 B2 | 8/2014 | Eclair et al. |
| 10,027,435 B2 | 7/2018 | Guy et al. |
| 10,063,313 B1 | 8/2018 | Al Sayeed et al. |
| 10,615,867 B1* | 4/2020 | Bhatnagar .............. G01M 11/33 |
| 10,826,601 B2 | 11/2020 | Bhatnagar et al. |
| 10,866,364 B1 | 12/2020 | Jones et al. |
| 11,063,683 B1 | 7/2021 | Jones et al. |
| 11,146,334 B2* | 10/2021 | Wu .................... H04B 10/2589 |
| 11,272,269 B1 | 3/2022 | Chedore et al. |
| 2002/0114060 A1* | 8/2002 | Kobayashi ........... H04B 10/298 |
| | | 359/341.44 |
| 2002/0168159 A1* | 11/2002 | Takahashi .......... G02B 6/02285 |
| | | 385/127 |
| 2003/0099032 A1* | 5/2003 | Asao .................. H04B 10/0777 |
| | | 359/341.4 |
| 2003/0151799 A1 | 8/2003 | Wight et al. |
| 2003/0174391 A1* | 9/2003 | Pan ........................ H01S 3/067 |
| | | 359/333 |
| 2004/0032643 A1* | 2/2004 | Chimfwembe ...... H04B 10/291 |
| | | 359/337 |
| 2004/0052526 A1 | 3/2004 | Jones et al. |
| 2004/0208504 A1 | 10/2004 | Solheim et al. |
| 2004/0213567 A1* | 10/2004 | Deguchi ................ H04B 10/03 |
| | | 398/32 |
| 2005/0074195 A1* | 4/2005 | Chi .................. H04B 10/07955 |
| | | 385/12 |
| 2005/0078959 A1* | 4/2005 | Shin .................... H04J 14/0273 |
| | | 398/45 |
| 2006/0023754 A1* | 2/2006 | Sridhar ............ H04B 10/25133 |
| | | 370/535 |
| 2007/0041006 A1* | 2/2007 | Abbott ................. H04B 10/071 |
| | | 356/73.1 |
| 2007/0064305 A1* | 3/2007 | Bogoni ................ H04B 10/275 |
| | | 359/341.41 |
| 2007/0229941 A1* | 10/2007 | Takeyama .......... H04B 10/2935 |
| | | 359/341.42 |
| 2008/0285602 A1* | 11/2008 | Nagai .................... H01S 3/2366 |
| | | 372/20 |
| 2009/0175620 A1 | 7/2009 | Bhatnagar et al. |
| 2011/0141552 A1* | 6/2011 | Ghera ................ H04B 10/2942 |
| | | 359/334 |
| 2011/0255875 A1* | 10/2011 | Mertz ................ H04B 10/5561 |
| | | 398/183 |
| 2012/0051739 A1* | 3/2012 | Stephens ............ H04B 10/0773 |
| | | 398/25 |
| 2014/0126912 A1 | 5/2014 | Bhatnagar |
| 2016/0308612 A1* | 10/2016 | Zhao ........................ G01J 3/00 |
| 2017/0122812 A1 | 5/2017 | Bhatnagar et al. |
| 2019/0036600 A1* | 1/2019 | Jiang ................ H04B 10/0775 |
| 2019/0074923 A1* | 3/2019 | Si ........................ H04J 14/0276 |
| 2019/0306595 A1 | 10/2019 | Jones et al. |
| 2021/0218491 A1 | 7/2021 | Jones et al. |
| 2021/0226408 A1 | 7/2021 | Boertjes et al. |
| 2024/0187123 A1* | 6/2024 | Jones .................. H04J 14/0293 |

FOREIGN PATENT DOCUMENTS

| | | |
|---|---|---|
| EP | 2993807 B1 | 3/2016 |
| JP | 2001053366 A | 2/2001 |
| WO | 97/23966 A1 | 7/1997 |
| WO | 02/39552 A2 | 5/2002 |

* cited by examiner

STRETCHED SINGLE OPTICAL SPAN COMMUNICATIONS SYSTEM AND METHOD AVOIDING HAZARDOUS POWER LEVELS

FIELD OF THE DISCLOSURE

The present disclosure relates generally to optical networking. More particularly, the present disclosure relates to systems and methods for a stretched single optical communication span, avoiding hazardous power levels.

BACKGROUND OF THE DISCLOSURE

Classic applications for single span systems in fiber optics can include festoon systems, channel crossings, terrestrial systems such as in remote areas (e.g., jungle, desert, etc.), and the like. In general terms in fiber optics, single span systems up to 35-45 dB may be supported using conventional amplification solutions. To go beyond these high single span losses (40 dB @ 0.2 dB/km equates to a 200 km single span) distributed amplification solutions are usually deployed. They usually start with counter-propagating distributed Raman amplification that uses the deployed system fiber for optical gain, but the most extreme links (beyond 50 dB) will often also use co-propagating Raman also and even Remote Optically Pumped Amplifiers (ROPA). ROPAs are achieved by embedding a passive (no electrical power required) amplifier stage in the optical cable some distance from the Terminal and then using the primary (and/or) other fibers to deliver an optical pump signal to the erbium doped fiber at the ROPA. In all the above cases (counter-Raman, co-Raman and ROPA) high optical power sources (500 mW to multi-W) are required at the Terminal site.

High Optical Power solutions including counter-Raman, co-Raman and ROPA operate at potentially dangerous power levels and so must include automatic safety systems for acceptable deployment. These systems typically include an ALSO (Automatic Laser Shut Off) system to reduce the power of the lasers to a safe level when a system fault (e.g., fiber break or disconnect) is detected. These safety systems increase the complexity and cost of the product. Furthermore, the high optical powers are at such a level that they can cause damage to the system fiber plant, particularly when high local losses are encountered. This can cause local heating and damage to the fibers and connectors. Therefore, the optical safety systems must also protect the system equipment, as well as users, from optical damage. This further complicates the safety system and often requires additional instrumentation (e.g., Optical Time Domain Reflectometers—OTDR) to identify concerns and assess the risk to system turn up. When encountering such fiber plant problems, the systems can be difficult to turn up and require expert operators to resolve the issue and/or cause customer frustration.

BRIEF SUMMARY OF THE DISCLOSURE

The present disclosure relates to systems and methods for a stretched single optical communication span, avoiding hazardous power levels. Specifically, the present disclosure provides a simplified approach to configure conventional off-the-shelf Erbium Doped Fiber Amplifiers (EDFAs) to provide a stretched single span communication system, without resorting to high power solutions such as distributed Raman amplification or remotely pumped amplifiers or specialized amplifier designs for high-loss spans. This allows for simple deployment in eye-safe configurations (Class 1 Hazard 1M) using low cost, low power equipment.

In an embodiment, a method of implementing a stretched single optical communication span includes receiving one or more optical signals from an optical fiber span having high loss; adding a pilot signal to the one or more optical signals, subsequent to the receiving; and amplifying the one or more optical signals and the pilot signal with a pre-amplifier that is an Erbium Doped Fiber Amplifier (EDFA). The method can further include demodulating the one or more optical signals subsequent to the amplifying. The or more optical signals can include a high noise tolerant optical modulation format. The high noise tolerant optical modulation format can be 100 Gbps Quadrature Phase Shift Keying (QPSK) using a 56 GBaud signal.

The stretched single optical communication span can operate below a Hazard 1M environment. A received power of the one or more optical signals can be less than −30 dBm. The EDFA can operate in a gain-controlled mode and is configured to shut off after a low input power. The low input power can be about −30 dBm. The high loss can be at least 40 dB. The method can further include monitoring separately a power of the one or more optical signals and the pilot signal. The one or more channels can include at least four channels. The pilot signal has spectrum located within an amplification bandwidth of the EDFA. The pilot signal can be formed by a local transmitter that is one of a laser and an Amplified Spontaneous Emission (ASE) source.

In another embodiment, a node in a stretched single optical communication span includes an optical multiplexer connected to an optical fiber span having high loss and a pilot signal, and configured to output a combination of one or more optical signals from the optical fiber span and the pilot signal; and a pre-amplifier that is an Erbium Doped Fiber Amplifier (EDFA), configured to receive the output of the optical multiplexer and provide amplification of the one or more optical signals and the pilot signal.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for a stretched single optical communication span, avoiding hazardous power levels. Specifically, the present disclosure provides a simplified approach to configure conventional off-the-shelf Erbium Doped Fiber Amplifiers (EDFAs) to provide a stretched single span communication system, without resorting to high power solutions such as distributed Raman amplification or remotely pumped amplifiers or specialized amplifier designs for high-loss spans. This allows for simple deployment in eye-safe configurations (Class 1 Hazard 1M) using low cost, low power equipment.

Generally, the present disclosure includes (1) use of a high noise tolerant optical modem, (2) conventional EDFAs that are "off-the-shelf" and within the Class 1 Hazard 1M limits, and (3) a technique at the receiver pre-amplifier to ensure the conventional EDFA operates in a gain control mode despite receiving extremely low-powered input signals.

Figure 1:
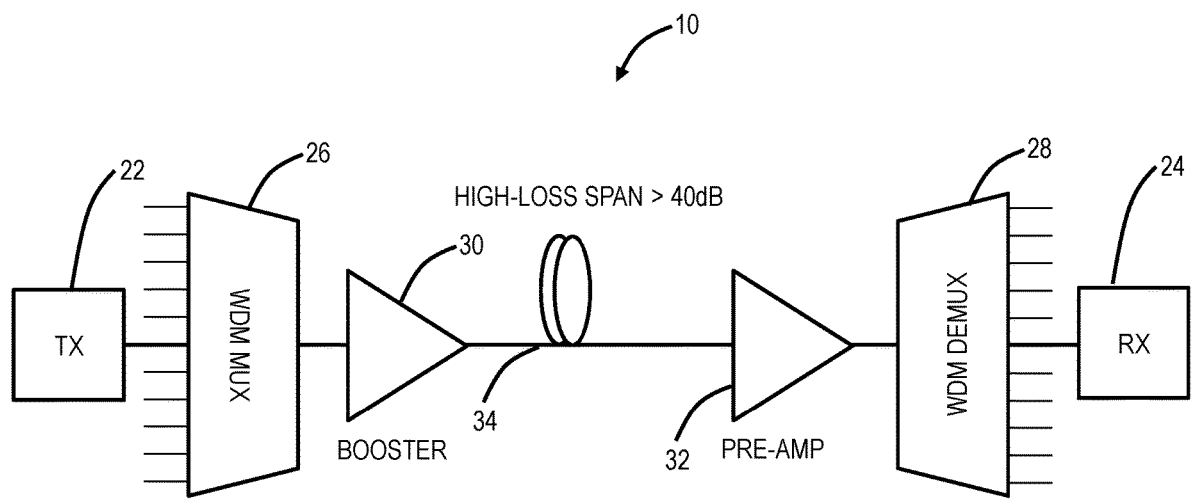
FIG. 1 is a diagram of a conventional single span optical system.
Figure 2:
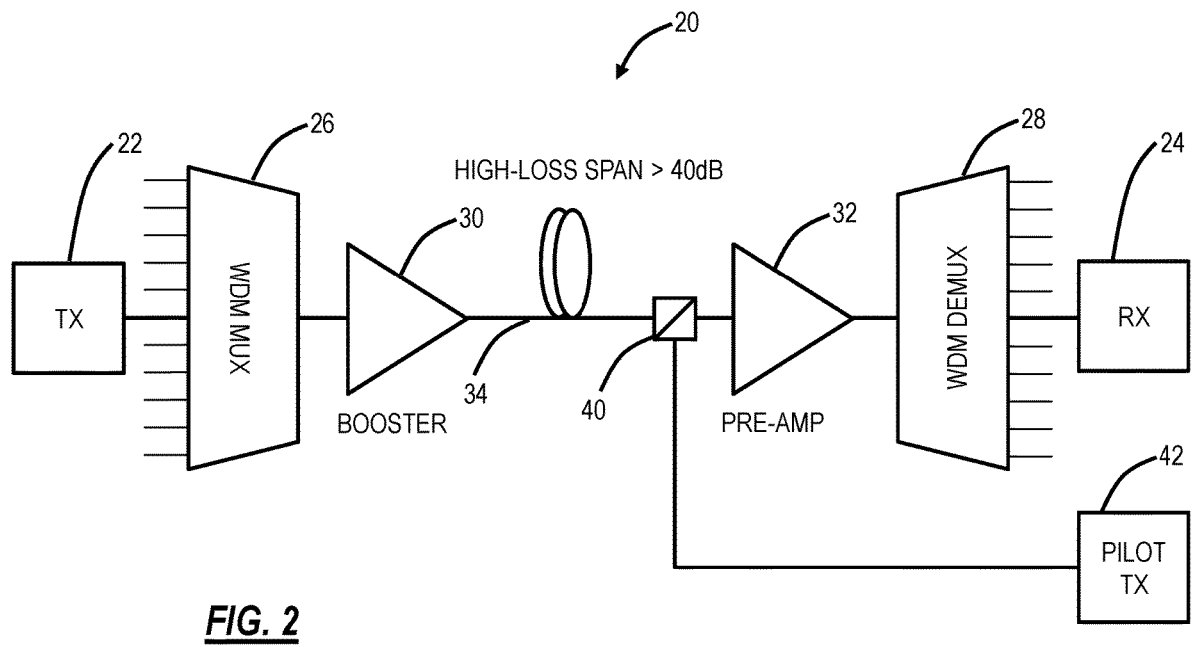
FIG. 2 is a diagram of a single span optical system according to an embodiment of the present disclosure.

FIG. 1 is a diagram of a conventional single span optical system 10. FIG. 2 is a diagram of a single span optical system 20 according to an embodiment of the present disclosure. Both FIGS. 1 and 2 are illustrated in a unidirectional configuration, from left to right. Also, FIGS. 1 and 2 are illustrated with a single channel (transmitter TX 22 and receiver RX 24). Those skilled in the art will recognize practical implementations can include a second set of equipment for bidirectional communications and there can be more than one channel, such as using Wavelength Division Multiplexing (WDM). The optical systems 10, 20 can include a WDM multiplexer (mux) 26 and WDM demultiplexer (demux) 28, for WDM.

The optical systems 10, 20 also include a booster amplifier 30, i.e., a conventional EDFA, and also known as a post amplifier. The booster amplifier 30 is located after the TX 22 and the WDM multiplexer 26. The optical systems 10, 20 also include a pre-amplifier 32, i.e., another conventional EDFA. The pre-amplifier 32 is located before the WDM demultiplexer 28 and the RX 24, and after a fiber span 34. In the present disclosure, the fiber span 34 is a high-loss span, such as having a loss in excess of 40 dB or the like.

The pre-amplifier 32 can have a gain of G dB and the output power of the pre-amplifier 32 is as follows:

$$P_{out} = P_{sig,out} + P_{ASE,out}$$

Where the $P_{sig,out}$ is the output power of any optical signals, and $P_{ASE,out}$ is the output power of noise from the pre-amplifier 32, i.e., Amplified Spontaneous Emission (ASE) noise. Unfortunately, the pre-amplifier 32 EDFA gain control is difficult to manage when $P_{sig,out} \ll P_{ASE,out}$ which is the case due to the high-loss span.

Again, in FIG. 2, the present disclosure utilizes
(1) high noise tolerant optical modems,
(2) conventional EDFAs that are "off-the-shelf" and within the Class 1 Hazard 1M limits, and
(3) a technique at the receiver pre-amplifier to ensure the conventional EDFA operates in a gain control mode despite receiving extremely low-powered input signals, namely a channel idler input to the pre-amplifier 32.

Advantageously, this approach meets requirements for extended span support, but in a way that is simple and low cost to deploy. This extends the reach of non-Raman systems by >10 dB and allows for easier to deploy systems that still meet the Hazard 1M safety requirement. Of significance, the high-loss span is typically located in remote areas, where it is difficult to reach, and this low cost and simple approach is beneficial for network operators.

High Noise Tolerant Optical Modems and Conventional EDFAs

The present disclosure uses the properties of a high noise tolerant coherent transceiver or modem system in combination with conventional Hazard 1M EDFAs to deliver a solution that is easy to turn up with no concerns for user, equipment or fiber plant safety.

Examples of high noise tolerant coherent modems include a 100 Gbps Quadrature Phase Shift Keying (QPSK) using a 56 GBaud signal, 100 Gbps Quadrature Phase Shift Keying (QPSK) using a 35 GBaud signal, 200 Gbps QPSK using a 63 Gbaud signal, and the like, i.e., having a high Required Optical Signal-to-Noise Ratio (ROSNR), such as 14 dB, as well as any coherent modulation scheme that uses sufficient Forward Error Correction (FEC) coding gain to only require a lower OSNR to recover the signal, e.g., <14 dB.

A high performance, high noise tolerant coherent modem, such as a 100 Gbps QPSK 56 GBaud transceiver, would typically have a TX power of up to +4 dBm and a minimum Rx power of −20 dBm. This would deliver an unamplified link budget of ~24 dB.

The TX 22 can be boosted by a head-end booster amplifier 30 to (say)+14 dBm, increasing the link budget to ~34 dB.

To achieve additional reach, the pre-amplifier 32 can be used at the tail end of the system 20. With an operating input power of (say) −30 dBm the pre-amplifier increases the link budget to ~44 dB. This is not limited by the required Signal-to-Noise Ratio (SNR) delivered to transceiver, but rather by the pre-amplifier's operating powers.

To facilitate ease of adding additional WDM channels both the booster amplifier 30 and the pre-amplifier 32 are operated in gain control mode. For many EDFAs, a Loss of Signal (LOS) shutdown system is included that turns the amplifier 30, 32 off when the input falls too low. This is often set to a threshold of about −30 dBm. This is included as when the input falls too low, the gain control of the EDFA becomes inaccurate and is largely controlling on the ASE output of the EDFA, this effectively turns the amplifier into a power-controlled device, rather than a gain controlled device. Whilst this is OK for single channel operation, it is less ideal for a multi-channel WDM where a constant gain is preferred to maintain channel independence.

Channel Idler

To provide constant gain, the present disclosure includes use of an optical mux 40 at the tail end of the system 20 (before the pre-amplifier 32), configured to provide a pilot signal locally to the pre-amplifier 32. This pilot signal may be generated from another optical source and can be a laser or even an ASE source, e.g., from a pilot TX 42. This then becomes the primary signal that determines the gain control of the pre-amplifier 32 and then the pre-amplifier 32 will provide uniform (does not change with loading) gain as additional very low power WDM channels are added. This technique allows for simple, conventional EDFAs to be used at constant gain with low operating signal powers without triggering LOS shut-down.

The optical mux 40 may be further enhanced with individual input power monitors to separately measure the incoming signal and the pilot signal. The optical mux 40 may be implemented as either a power combiner or a filter. The pilot TX 42 needs to have a wavelength or range of spectrum that (1) does not interfere with any channels in the system 20, and (2) that is within the amplification bandwidth of the pre-amplifier 32, i.e., about 1530-1565 nm). In an embodiment, the pilot TX 42 can be a non-used TX 22 as well as a dedicated source. The optical mux 40 may be packaged either external to the EDFA module or integrated within the EDFA module, where the EDFA module is for the pre-amplifier 32.

In the context of the high noise tolerant coherent modem, this allows the amplifiers 30, 32 to be operated simply whilst supporting greater spans losses, that can be increased up to the SNR limit of the transceiver. In many cases, this will allow >10 dB of additional link budget to be supported before the SNR limit is achieved. Our simulation and testing has shown this can allow for 55-60 dB of link budget support to be achieved.

The head end powers of the system 20 dictate the safety classification and (for example) with a nominal launch power of ~14 dBm, it is possible to support four WDM channels into total and still stay within the <21 dBm limit required for Hazard 1M.

Using this method we can achieve >55 dB link budget support using simple Hazard 1M EDFA and operating in Gain control to allow for simple traffic addition up to 4 WDM channels. This provides a strong transmission capability (400 Gbps) over high-loss (>55 dB) links without requiring user or equipment safety systems.

Process

Figure 3:
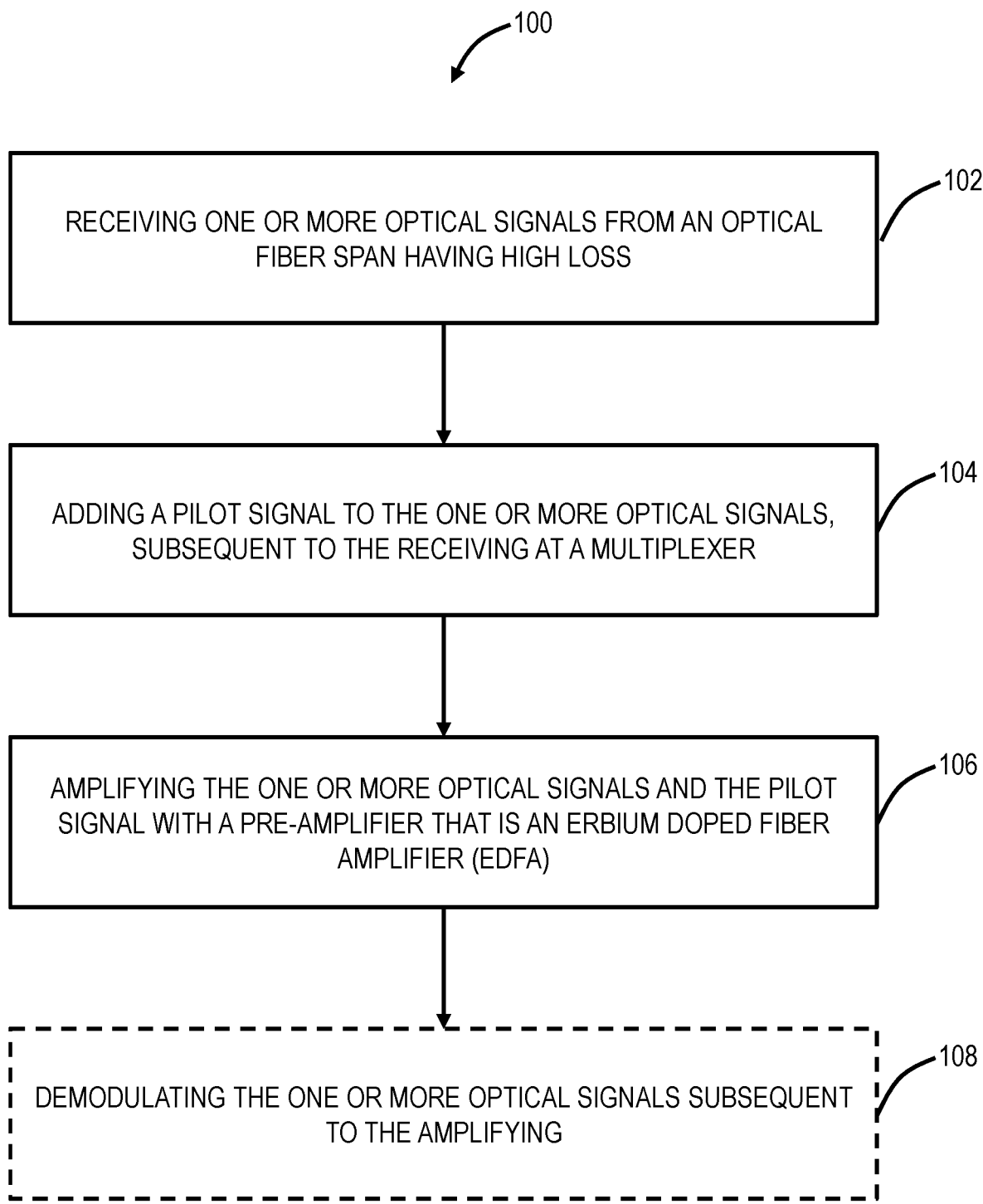
FIG. 3 is a flowchart of a process for operating a single span optical system according to an embodiment of the present disclosure.

FIG. 3 is a flowchart of a process 100 for operating a single span optical system according to an embodiment of the present disclosure. The process 100 includes receiving one or more optical signals from an optical fiber span having high loss (step 102); adding a pilot signal to the one or more optical signals, subsequent to the receiving (step 104); and amplifying the one or more optical signals and the pilot signal with a pre-amplifier that is an Erbium Doped Fiber Amplifier (EDFA) (step 106). The process 100 can include demodulating the one or more optical signals subsequent to the amplifying, i.e., subsequent to the receiving at the multiplexer 40 (step 108).

The one or more optical signals can include a high noise tolerant optical modulation format. For example, the high noise tolerant optical modulation format can be 100 Gbps Quadrature Phase Shift Keying (QPSK) using a 56 GBaud signal. The stretched single optical communication span operates below a Hazard 1M environment. A power of the one or more optical signals can be less than −30 dBm. The EDFA operates in a gain controlled mode and is configured to shut off after a low input power. The low input power can be about −30 dBm.

The high loss can be at least 40 dB. The process 100 can include monitoring separately a power of the one or more optical signals and the pilot signal. The one or more channels can include at least four channels. The pilot signal can have spectrum located within an amplification bandwidth of the EDFA. The pilot signal can be formed by a local transmitter that is one of a laser and an Amplified Spontaneous Emission (ASE) source.

In another embodiment, a node in a stretched single optical communication system 20 includes an optical multiplexer 40 connected to an optical fiber span 34 having high and a pilot signal, and configured to output a combination of one or more optical signals from the optical fiber span and the pilot signal; and a pre-amplifier 32 that is an Erbium Doped Fiber Amplifier (EDFA), configured to receive the output of the optical multiplexer and provide amplification of the one or more optical signals and the pilot signal.

The node can further include one or more receivers 34 configured to demodulate the one or more optical signals subsequent to the amplification. The one or more optical signals can include a high noise tolerant optical modulation format.

The stretched single optical communication span operates below a Hazard 1M environment. A received power of the one or more optical signals is less than −30 dBm. The EDFA operates in a gain-controlled mode and is configured to shut off after a low input power. The high loss is at least 40 dB.

Test/Experimental Setup and Results

Figure 4:
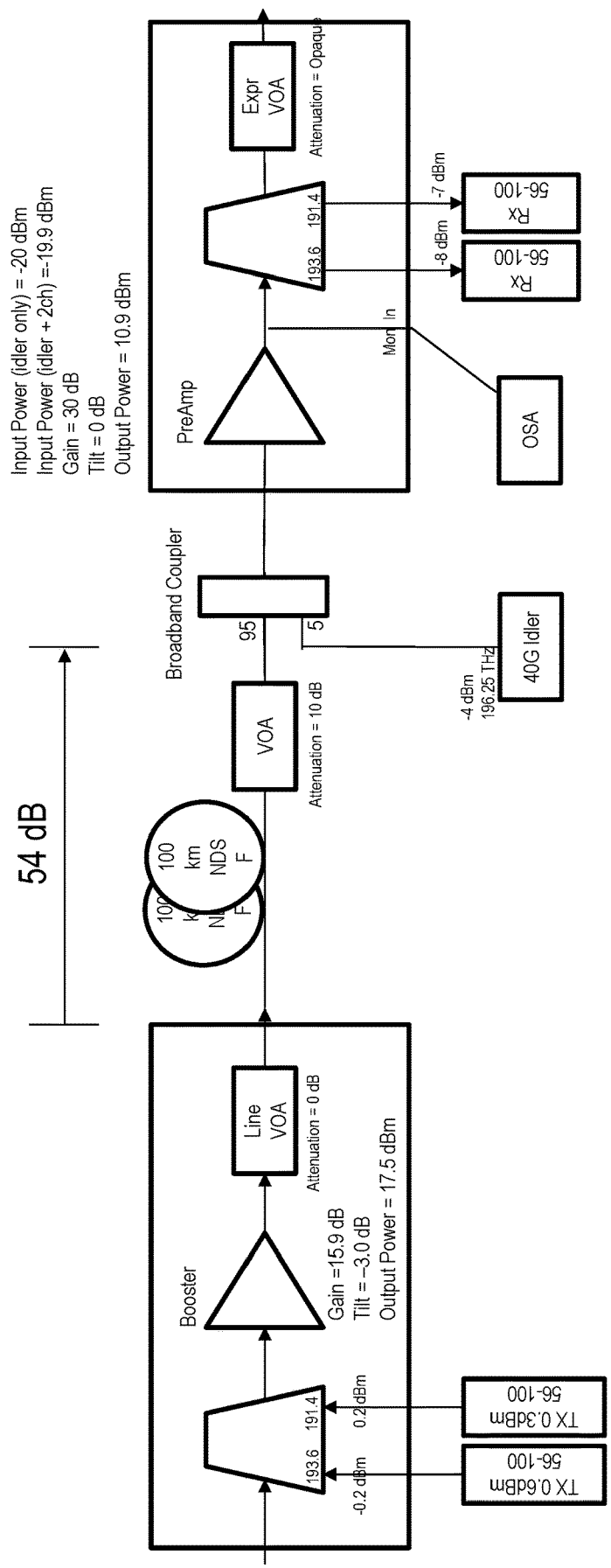
FIG. 4 is a diagram of an experimental setup illustrating results utilizing the present disclosure.

FIG. 4 is a diagram of an experimental setup illustrating results utilizing the present disclosure. The experimental setup includes two transmitters, each being a 100 Gbps QPSK at 56 Gbaud, and having frequencies of 193.6 THz and 191.4 THz. This is 200 Gbps total and the two multi-plexed wavelengths are boosted by a conventional EDFA (post-amplifier) to provide an output power of 17.5 dBm.

The span is set to 54 dB loss which is based on 200 km of Non-Dispersion Shifted Fiber (NDSF) in addition to a Variable Optical Attenuator (VOA) set at 10 dB. After the span, there is a broadband coupler that combines an idler channel (the pilot Tx 42), in this case a 40 Gbps signal, with the two multiplexed wavelengths. The combination of signals is provided to a preamplifier 32 with a gain of about 30 dB. The idler channel has an output power of −4 dBm, such that the input power to the preamplifier 32 is −20 dBm for just the idler channel and −19.9 dBm for the idler channel plus the two multiplexed wavelengths.

Finally, the two multiplexed wavelengths are demultiplexed and demodulated with a power of −8 dBm and −7 dBm, respectively.

The following results were seen including Optical Signal-to-Noise Ratio (OSNR) from an Optical Spectrum Analyzer (OSA) and other data from Performance Monitoring (PM) data associated with the modem (Rx).

| Parameter | 193.6 | 191.4 | Comment |
|---|---|---|---|
| OSNR | 14.2 | 15.28 | From OSA |
| Total Input Power | −7.0 | −6.8 | Modem PM |
| Channel Rx Power | −8.0 | −7.0 | Modem PM |
| Rx Chromatic Dispersion | 1745/3481 | 1857/3707 | Modem PM |
| preFEC BER | 2.9E−03 | 1.2E−03 | Modem PM |
| Qavg | 8.8 dBQ | 9.65 dBQ | Modem PM |
| SNRext | 6.04 dB | 6.92 dB | Modem PM |
| ESNR | 5.71 dB | 6.53 dB | Modem PM |

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method of implementing a stretched single optical communication span, the method comprising steps of:
   receiving one or more optical signals from an optical fiber span having high loss of at least 40 dB;
   adding a pilot signal to the one or more optical signals, subsequent to the receiving; and
   amplifying the one or more optical signals and the pilot signal with a pre-amplifier that is an Erbium Doped Fiber Amplifier (EDFA) where the pilot signal is used for gain control of the pre-amplifier.

2. The method of claim 1, wherein the steps further include demodulating the one or more optical signals subsequent to the amplifying.

3. The method of claim 1, wherein the one or more optical signals include a high noise tolerant optical modulation format that includes one of 100 Gbps Quadrature Phase Shift Keying (QPSK) using a 66 GBaud signal, 100 Gbps Quadrature Phase Shift Keying (QPSK) using a 36 GBaud signal, and 200 Gbps QPSK using a 63 Gbaud signal.

4. The method of claim 1, wherein the pilot signal added after the optical fiber span prior to the amplifying.

5. The method of claim 1, wherein the stretched single optical communication span operates below a Hazard 1M environment.

6. The method of claim 1, wherein a received power of the one or more optical signals is less than −30 dBm.

7. The method of claim 1, wherein the EDFA operates in a gain-controlled mode and is configured to shut off after a low input power.

8. The method of claim 7, wherein the low input power is about −30 dBm.

9. The method of claim 1, wherein the pilot signal is used to provide constant gain where the pilot signal is a primary signal that determines gain control of the pre-amplifier instead of the one or more optical signals which are at lower power than the pilot signal.

10. The method of claim 1, wherein the steps further include
    monitoring separately a power of the one or more optical signals and the pilot signal.

11. The method of claim 1, wherein the one or more channels include at least four channels.

12. The method of claim 1, wherein the pilot signal has spectrum located within an amplification bandwidth of the EDFA.

13. The method of claim 1, wherein the pilot signal is formed by a local transmitter that is one of a laser and an Amplified Spontaneous Emission (ASE) source.

14. A node in a stretched single optical communication span, the node comprising:
    an optical multiplexer connected to an optical fiber span having high loss of at least 40 dB and a pilot signal, and configured to output a combination of one or more optical signals from the optical fiber span and the pilot signal; and
    a pre-amplifier that is an Erbium Doped Fiber Amplifier (EDFA), configured to receive the output of the optical multiplexer and provide amplification of the one or more optical signals and the pilot signal where the pilot signal is used for gain control of the pre-amplifier.

15. The node of claim 14, further comprising
    one or more receivers configured to demodulate the one or more optical signals subsequent to the amplification.

16. The node of claim 14, wherein the one or more optical signals include a high noise tolerant optical modulation format that includes one of 100 Gbps C quadrature Phase Shift Keying (QPSK) using a 56 GBaud signal, 100 Gbps Quadrature Phase Shift Keying (QPSK) using a 35 GBaud signal, and 200 Gbps QPSK using a 63 Gbaud signal.

17. The node of claim 14, wherein the stretched single optical communication span operates below a Hazard 1M environment.

18. The node of claim 14, wherein a received power of the one or more optical signals is less than −30 dBm.

19. The node of claim 14, wherein the EDFA operates in a gain-controlled mode and is configured to shut off after a low input power.

20. The node of claim 14, wherein the pilot signal is added after the optical fiber span, prior to the pre-amplifier.

* * * * *